United States Patent [19]

Broussalian et al.

[11] Patent Number: 5,417,355
[45] Date of Patent: May 23, 1995

[54] DISPENSING VALVE FOR FROZEN SOFT SERVE CONFECTIONS

[75] Inventors: James V. Broussalian, Sepulveda, Calif.; John W. Gilliom, Wooster, Ark.

[73] Assignee: Baskin-Robbins USA, Co., Glendale, Calif.

[21] Appl. No.: 121,039

[22] Filed: Sep. 13, 1993

Related U.S. Application Data

[63] Continuation-in-part of Ser. No. 829,413, Feb. 3, 1992, Pat. No. 5,244,277, which is a continuation-in-part of Ser. No. 739,994, Aug. 2, 1991, abandoned.

[51] Int. Cl.⁶ .............................................. B67D 5/62
[52] U.S. Cl. .............................. 222/146.6; 222/389; 251/61.1
[58] Field of Search .................. 222/95, 146.6, 325, 222/394, 396, 397, 325–327, 504, 513, 522, 523, 531, 559, 387, 389; 62/389, 390, 393–396; 251/61.1, 210, 284, 328, 353; 220/93; 138/93

[56] References Cited

U.S. PATENT DOCUMENTS

| | | | |
|---|---|---|---|
| 1,873,138 | 8/1932 | Mitchell | 251/61.1 |
| 2,218,779 | 10/1940 | Wendt et al. | 297/3 |
| 2,311,000 | 2/1943 | Smith et al. | 62/102 |
| 2,517,234 | 8/1950 | Phelan | 62/99 |
| 3,502,297 | 3/1970 | Wardrup | 251/61.1 |
| 3,898,859 | 8/1975 | Duke | 62/135 |
| 4,122,869 | 10/1978 | Roberson, Sr. | 138/93 |
| 4,124,147 | 11/1978 | Priese et al. | 251/61.1 |
| 4,231,492 | 11/1980 | Rios | 222/95 |
| 4,463,572 | 8/1984 | Brown, Jr. | 62/135 |
| 4,707,997 | 11/1987 | Bigler et al. | 62/341 |
| 4,830,515 | 5/1989 | Cortes | 374/208 |
| 4,860,550 | 8/1989 | Aoki et al. | 62/135 |
| 4,886,371 | 12/1989 | Fondin | 374/141 |
| 5,048,724 | 9/1991 | Thomas | 222/95 |
| 5,066,142 | 11/1991 | DeFrank | 374/208 |
| 5,069,364 | 12/1991 | McGill | 222/95 |
| 5,265,764 | 11/1993 | Rowe et al. | 222/146.6 |

*Primary Examiner*—Andres Kashnikow
*Assistant Examiner*—Philippe Derakshani
*Attorney, Agent, or Firm*—Christie, Parker & Hale

[57] ABSTRACT

A dispenser for frozen soft serve confections comprises a refrigerated dispensing cabinet. One or more rigid cartridges containing frozen soft serve confection are releasably mounted within the interior of the dispensing cabinet. Each cartridge uses compressed air to urge the frozen confection from the cartridge through a valve assembly. A valve assembly comprises a valve body that defines a passageway that connects an inlet opening at the cartridge with an outlet opening outside the dispensing cabinet. A valve for alternatively blocking or permitting flow of frozen confection through the passageway is provided at the outlet opening. The valve can include a piston that is moved between the opened and closed positions by a lever. The valve can also include an inflatable bladder that is alternatively inflated or deflated by compressed air that flows through a push button switch. When inflated, the flow of frozen confection is prevented and when deflated, flow is permitted. If a bladder valve is used, a leak detection system senses any leak in the compressed air system and operates a pressure switch to simultaneously block further flow of compressed air to the cartridge and depressurized the cartridge to prevent the contents of the cartridge from spilling.

17 Claims, 16 Drawing Sheets

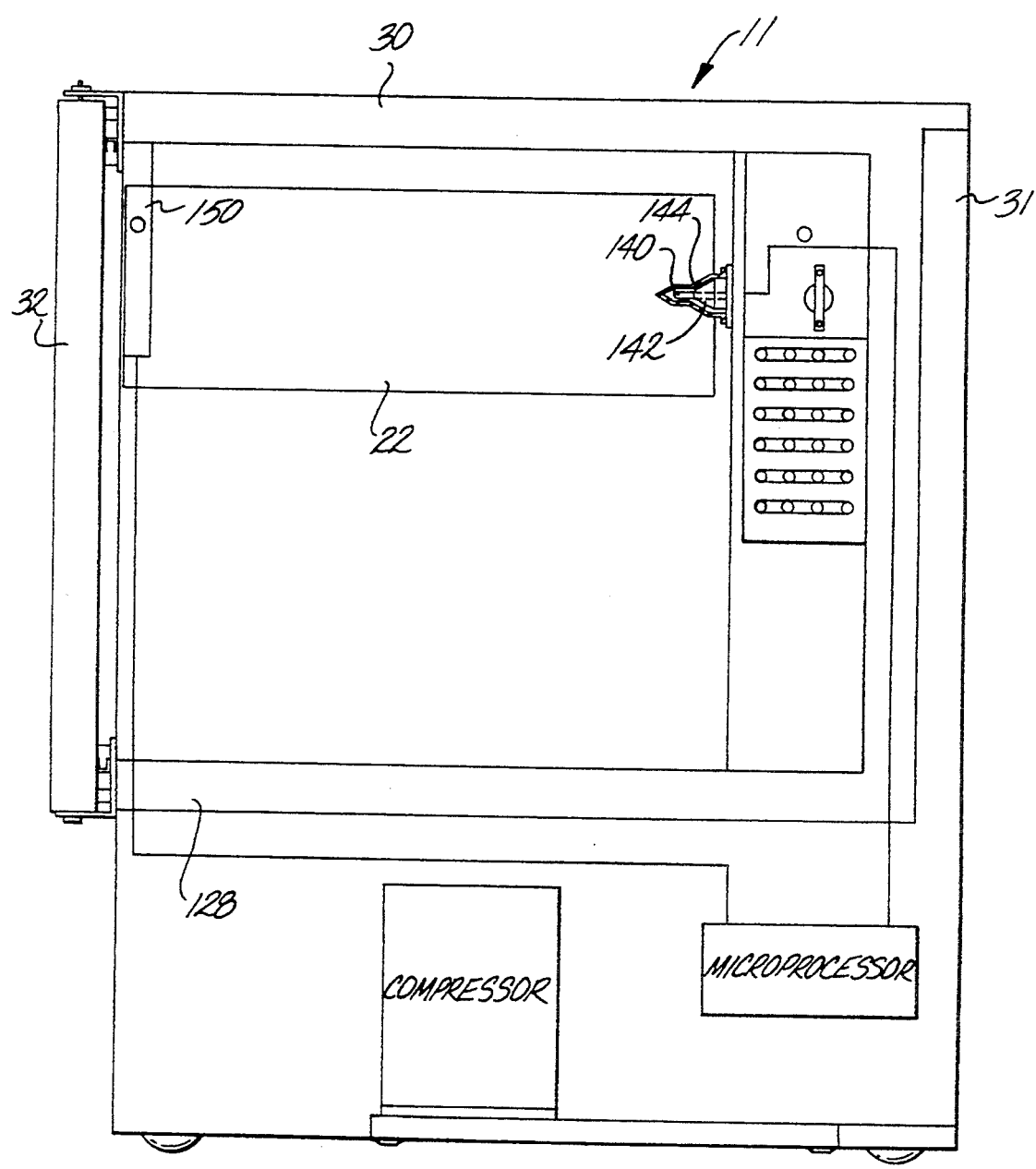

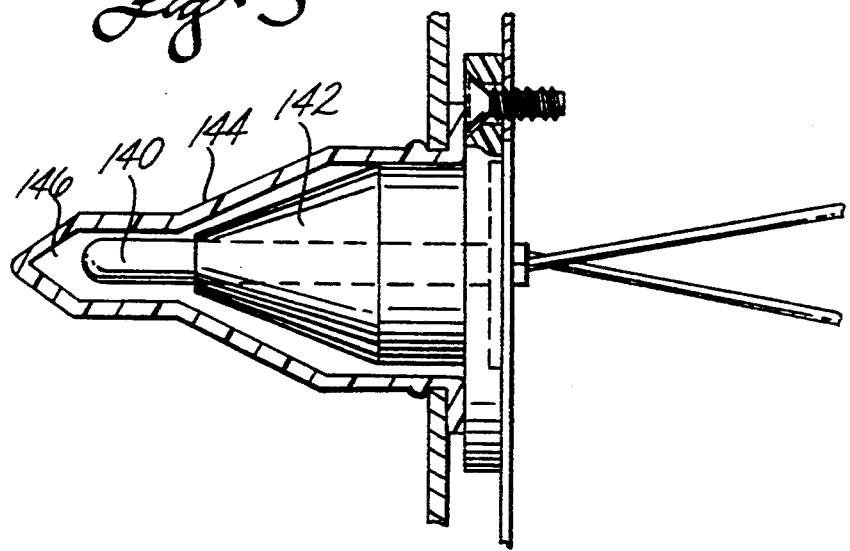
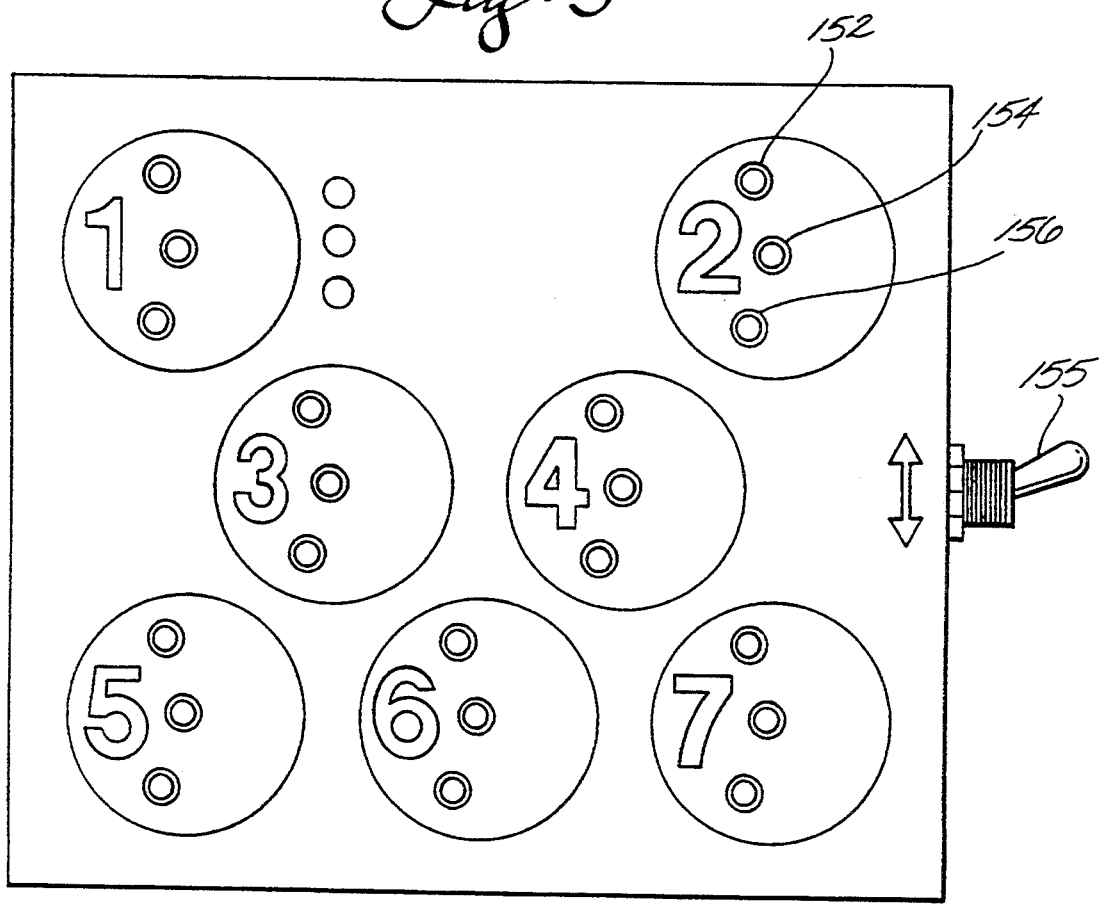

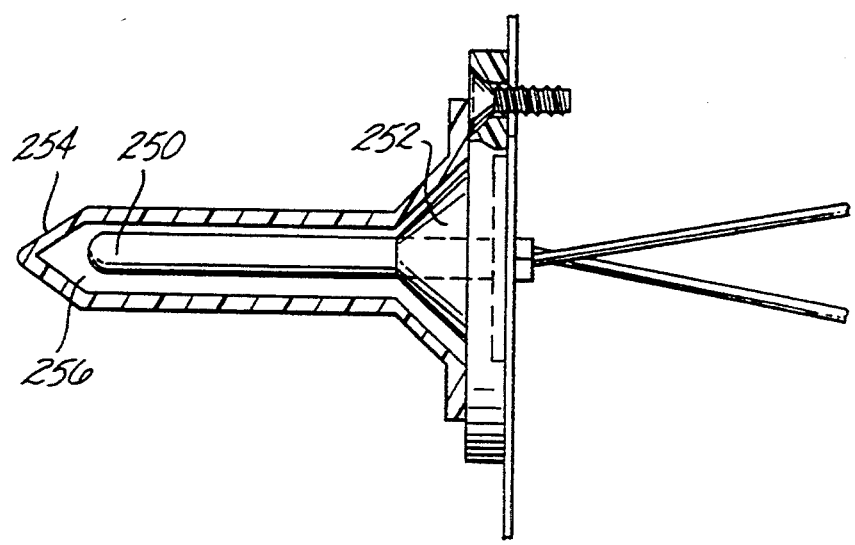

DISPENSING VALVE FOR FROZEN SOFT SERVE CONFECTIONS

CROSS-REFERENCE TO RELATED APPLICATIONS

This application is a continuation in part of application Ser. No. 07/829,413, filed Feb. 3, 1992 now U.S. Pat. No. 5,244,277 which is a continuation in part of application Ser. No. 07/739,994, filed Aug. 2, 1991, now abandoned.

FIELD OF THE INVENTION

This invention relates to a dispensing unit for frozen soft serve confections such as ice creams and yogurts.

BACKGROUND OF THE INVENTION

Frozen soft-serve confections such as ice creams and yogurts have gained wide popularity among the consumers. Such soft serve products are conventionally made on-site at retail outlets. Typically, a liquid mix is poured into a mixer and dispensing unit wherein the mix is combined with air under proper agitation at appropriate temperatures. This produces a soft-serve product which is maintained within the unit at the dispensing temperature until dispensed.

On site production of soft-serve products works well but has several drawbacks. The machinery requires extensive cleaning which, if not done properly, leads to bacterial contamination. The machinery, which is fairly complex, is expensive and subject to frequent breakdown. The production of small quantities of product at numerous sites by different individuals leads to inconsistency in quality control and hence, product quality.

It has been suggested that the soft serve product be formulated and produced in final dispensing form at a central facility, and then hard frozen for storage and shipping. "Hard frozen" refers to a temperature below the dispensing temperature and typically below or at about 0° F. Once a hard frozen product is received at the retail site, it is thawed or tempered to and maintained at the desired dispensing temperature, and then dispensed. Such a process obviates a need for a combined mixing and dispensing unit and allows the use of a simpler dispensing apparatus at the retail site.

PCT Application No. WO 90/05697 discloses an apparatus for dispensing frozen soft serve confections from a collapsible bag. The bag is mounted vertically within a dispensing cabinet and soft serve product is dispensed at the top of the bag through a valve. The soft serve product is urged out of the bag by a movable piston.

SUMMARY OF THE INVENTION

The present invention provides an apparatus for dispensing frozen soft serve confection. The apparatus comprises a dispensing cabinet for receiving one or more rigid cartridges containing frozen soft serve confection. Refrigeration and temperature control means are provided for maintaining the temperature of the interior of the dispensing cabinet at a predetermined dispensing temperature for the soft serve confection.

One or more rigid cartridges containing frozen soft serve confection are releasably mounted within the dispensing cabinet. The cartridges comprise a moveable piston within the interior of the cartridge above the frozen soft serve confection. Means, and preferably compressed air means, are provided for urging the piston downwardly against the frozen soft serve confection to dispense the soft serve confection through an opening at the bottom of the cartridge.

Valve means are provided comprising an inlet opening within the interior of the dispensing cabinet for receiving frozen soft serve confection from the cartridge, an outlet opening outside of the dispensing cabinet through which the frozen soft serve confection is dispensed and a passageway between the inlet and outlet openings. A plunger movable between opened and closed positions permits flow of frozen confection through the passageway to the outlet opening.

In a preferred embodiment of the invention, the valve means comprises an inflatable bladder that can be inflated with compressed air to block flow of frozen confection through the passageway or deflated to permit flow. A push button switch is used to control the bladder valve. In its normal operating position, the push button switch permits air to flow to the bladder to keep the bladder inflated and the valve closed. When the push button switch is depressed, the flow of air to the bladder is blocked and the bladder is simultaneously depressurized to permit flow of frozen confection.

In a particularly preferred embodiment comprising a compressed air operated bladder valve and compressed air means for urging the piston downward against the frozen confection, there is further provided, a leak detection system for preventing the cartridge containing frozen confection from emptying its contents in the event the bladder valve fails due to a leak or compressed air failure. The leak detection system shuts off the compressed air means for urging the piston downwardly if an air leak in the bladder valve is detected.

In either a mechanical valve or an air operated valve, the valve body includes a recess that communicates with the refrigerated air within the dispensing cabinet to keep the valve body cool and prevent any frozen confection located within the valve from melting.

In a preferred embodiment of the invention, the apparatus comprises a tempering cabinet for tempering cartridges of frozen soft serve confection from a hard frozen temperature to a predetermined serving temperature. Refrigeration and temperature control means are provided for maintaining the tempering cabinet at a predetermined serving or dispensing temperature. The tempering cabinet preferably comprises means for monitoring the temperature of frozen soft serve confection in each cartridge within the tempering cabinet and for displaying a signal when the frozen soft serve confection has reached the desired dispensing temperature.

Preferred means for releasably securing the cartridge in the dispensing cabinet comprises means for releasably securing the cartridge to the base. Particularly preferred releasably securing means comprises a pivoting head plate vertically moveable by means of an air driven piston between a down position engaging the top end of the cartridge which is mounted on the base and preventing upward movement of the cartridge and a release position spaced-apart vertically from the top end of the cartridge. An airway is provided in the pivoting head plate for directing compressed air from a compressed air source to the top of the rigid cartridge when the head plate is in its down position. A valve means is preferably provided in the head plate to block the flow of compressed air through the airway when the head plate is moved upwardly from its down position to its release position.

BRIEF DESCRIPTION OF THE DRAWINGS

These and other features and advantages of the present invention will be better understood by reference to the following detailed description when considered in conjunction with the accompanying drawings wherein:

FIG. 2 is a side cut away view of a preferred tempering cabinet;

FIG. 3 is a side cross-sectional view of a preferred temperature probe and cartridge cap;

FIG. 4 is a side cross-sectional view of a preferred temperature probe and cartridge cap;

FIG. 5 is a front view of a preferred display board;

DETAILED DESCRIPTION

Figure 1:
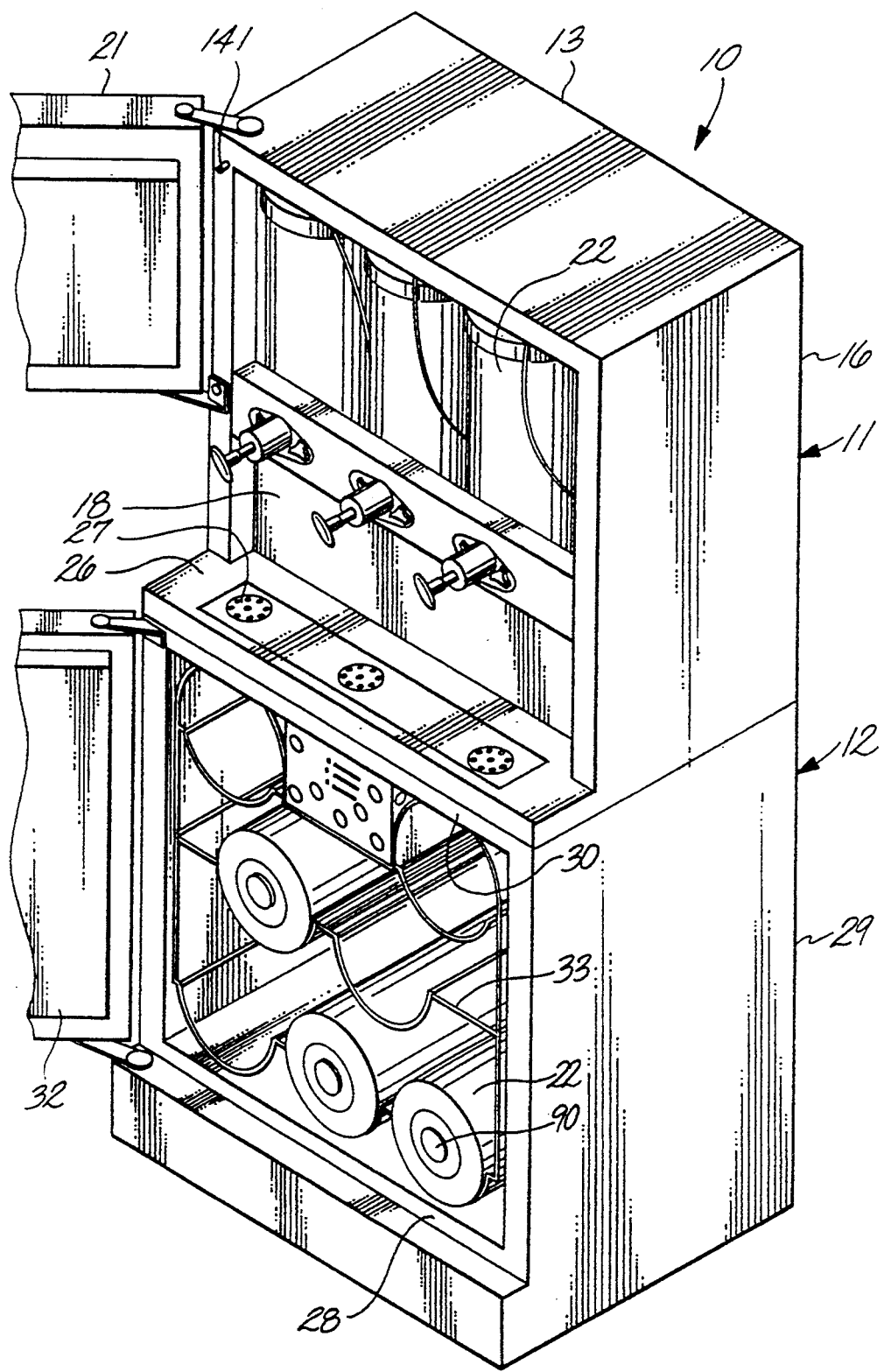
FIG. 1 is a perspective view of a preferred dispensing unit constructed in accordance with the present invention.

A particularly preferred dispensing unit constructed in accordance with the present invention is shown in FIG. 1. The dispensing unit 10 comprises an upper refrigerated dispensing cabinet 11 and a lower refrigerated tempering cabinet 12. The dispensing cabinet 11 is defined by a top wall 13, bottom wall (hidden), two side walls 16 and a rear wall (hidden). A short front wall 18 extends upwardly from the front edge of the bottom wall 14. A hinged door 21 is provided at the front of the dispensing cabinet 11 to provide access into the interior of the dispensing cabinet. All walls and the door are insulated. Seals are provided between the door 21 and the front of the dispensing cabinet 11 to prevent leakage of cold air from the interior of the dispensing cabinet 11 when the door 21 is closed.

In the embodiment shown, the dispensing cabinet 11 is designed to hold three 2-gallon cartridges 22 of frozen soft serve product. Associated with each cartridge is a valve assembly (shown in FIG. 2) and a lock-down assembly for holding a cartridge 22 in place on the valve assembly. A portion of the valve assembly extends through the front wall 18 of the dispensing cabinet 11 and provides an outlet opening outside of the dispensing cabinet 11 through which the soft serve product is dispensed. The dispensing cabinet 11 comprises a ledge 26 below the outlet openings of the valve assemblies. The ledge comprises traps over which grates 27 are mounted for capturing any soft serve product spilled onto the ledge 26.

Below the dispensing cabinet 11 is the tempering cabinet 12. The tempering cabinet is defined by a bottom wall 28, side walls 29, a top wall 30 and a rear wall 31. A hinged door 32 is provided at the front of the tempering cabinet 12 to provide access to the interior of the tempering cabinet 12. Again all walls and the door 32 are insulated and seals are provided between the door 32 and the front of the tempering cabinet 12 to prevent leakage of cold air from the interior of the tempering cabinet when the door 32 is closed.

A rack 33 is positioned within the tempering cabinet 12 to support one or more cartridges 22 of soft serve product. In the embodiment shown, the rack 33 is designed to support seven cartridges in a generally horizontal orientation.

Means are provided in each of the dispensing and tempering cabinets 11 and 12 to maintain the temperature of the cabinet at about the dispensing temperature of the soft serve product, which is typically 16°–22° F. For example, it has been found that a refrigeration unit manufactured by Tecumseh Corporation under the trade designation AE1336AA and a temperature control unit manufactured by Zytron Corporation under the trade designation 120-9-Z105-026 are suitable to maintain the temperature of each of the dispensing and tempering cabinets 11 and 12 within about 1° of the desired dispensing temperature.

In a particularly preferred embodiment of the invention, there is a product temperature monitoring means in the tempering cabinet 12. The product temperature monitoring means provides a visual signal to let the operator know when a hard frozen cartridge of soft serve product within the tempering cabinet has warmed to the predetermined serving temperature, e.g., 17° F. With reference to FIGS. 2–4, the product temperature monitoring means comprises a temperature probe 140 for each cartridge 22 mountable in the tempering cabinet 12. The probe 140 is mounted on the rear wall 31 of the tempering cabinet 12 by means of a bushing 142 and extends forwardly into the cabinet 12. A presently preferred temperature probe 140 extends about 2 inches into the tempering cabinet 12 and is about ¼ inches in diameter.

In this embodiment, each cartridge 22 has a removable cap 144 which has a recess 146 extending axially into the interior of the cartridge 22 a distance at least as great as the distance that the temperature probe 140 extends forwardly into the tempering cabinet 12. When the cartridge 22 is loaded onto the rack 33 in the tempering cabinet 12, the temperature probe 140 extends into the recess 146. In the embodiment shown, the shape of the recess 146 corresponds generally to the shape of the temperature probe 140 and bushing 142. It is understood that the sizes and shapes of the probe 140, bushing 142 and recess 146 of the cap 144 may vary as desired. For example, FIG. 4 shows a probe 250, bushing 252 and cap 254 with a recess 256 which is also suitable for use in the present invention.

It has been found that the above described temperature probe and cartridge cap arrangement provides an accurate means for monitoring the temperature of the product contained within the cartridge 22. That is, it has been found that the temperature probe 140 need not actually touch the product, which is preferable for sanitary reasons. However, arrangements wherein the temperature probe extends through the cartridge cap and contacts the product within the cartridge, could be used if desired.

The temperature probe 140 is electrically connected by wires to a microprocessor 148 which receives electrical input signals from the probe 140 reflective of the temperature of the product within the cartridge. The microprocessor 148 monitors the input signals from the probe 140 and activates one of a set of indicator lights on a display board 150 within the tempering cabinet 12 depending on the temperature input signal received. A preferred display board 150 is shown in FIG. 5. The display board 150 comprises a set of three lights associated with each cartridge 22 mountable on the rack 33. Each set of lights comprises a red "not ready" light 152 which is activated when the input signal to the microprocessor 148 corresponds to a product temperature below the desired serving temperature. A green "ready" light 154 is activated when the input signal to the microprocessor 148 indicates that the product has reached the desired serving temperature. A yellow "caution" light 156 is activated when the input signal to the microprocessor 148 indicates that the product temperature is above the desired serving temperature.

Preferably, the microprocessor 148 is programmed to activate a fourth light or to cause one of the three lights, e.g., the red light 152, to flash when the input signal from the temperature probe 140 indicates that the product has reached the serving temperature but has been maintained for less than a predetermined period, e.g., 3 hours. In such a further embodiment, the green "ready" light 154 will be activated only after the serving temperature has been achieved and maintained for more than the predetermined period.

Any suitable programmable microprocessor may be used in this application. Further, any suitable program for activating the appropriate indicator lights in response to a input signal from the temperature probe may be used. Such programs are well within the art.

If desired, the tempering cabinet may comprise an on/off switch 155 to activate and deactivate the refrigeration means as well as the product temperature monitoring means. In the embodiment shown, the on/off switch 155 is mounted on the display board 150.

It is understood that the sizes of the dispensing and tempering cabinets 11 and 12 are a matter of choice and may be varied as desired. It is also understood that, while preferred, the dispensing unit 10 need not comprise a tempering cabinet 12.

Figure 6:
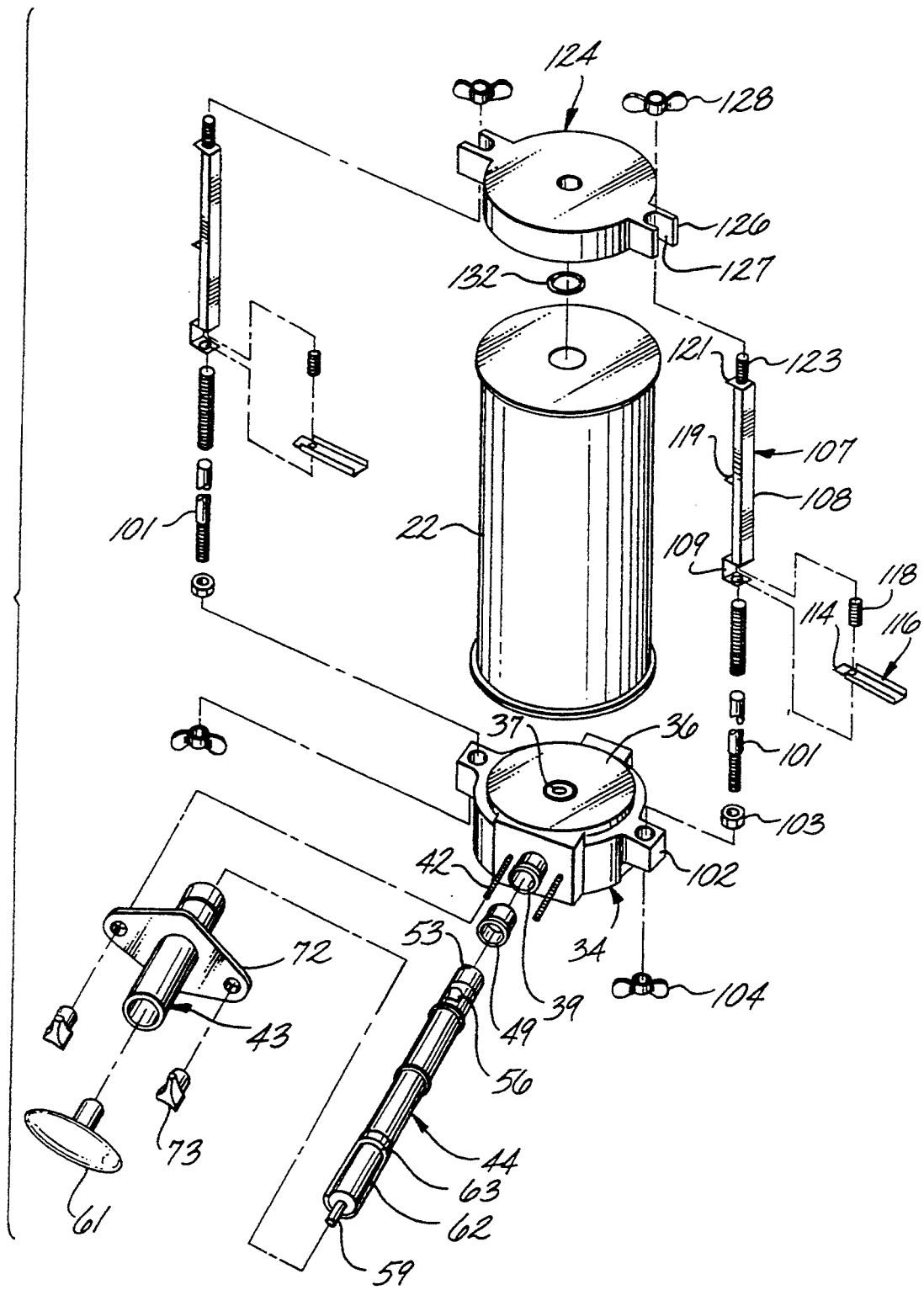
FIG. 6 is an exploded perspective view showing a preferred valve assembly, lock-down assembly and cartridge.

With reference to FIG. 6, a preferred valve assembly comprises a base 34 having a flat generally circular upper surface 36. In the embodiment shown, the thickness of the base 34 is about 2.25 inches and the diameter of the upper surface 36 is about 6.5 inches.

A central, generally vertical bore 37 extends downwardly into the base 34 from the upper surface 36. The outer edge of the upper surface defining its outer perimeter and the inner edge of the upper surface defining the vertical bore are chamfered. A horizontal or transverse bore 38 extends the entire width of the base 34 below the upper surface 36 for receiving a valve plunger 44. In the embodiment shown, the transverse bore is approximately 1.25 inches in diameter.

A short, tubular, generally cylindrical extension 39, coaxial with the transverse bore 38, protrudes forwardly about 0.75 inches from the front of the base 34 and extends through an opening in the front wall 18 of the dispensing cabinet 11. The inner diameter of the extension 39 is the same as the diameter of the transverse bore 38 and essentially extends the length of the transverse bore 38. The extension 39 comprises a circumferential groove about its exterior which carries an O-ring 41. A pair of threaded collar studs 42 extend forwardly from the front of the base 34 through the front wall 18 of the dispensing cabinet 11 on opposite sides of the tubular extension 39 for mounting a valve collar 43 over the extension 39.

Figure 7:
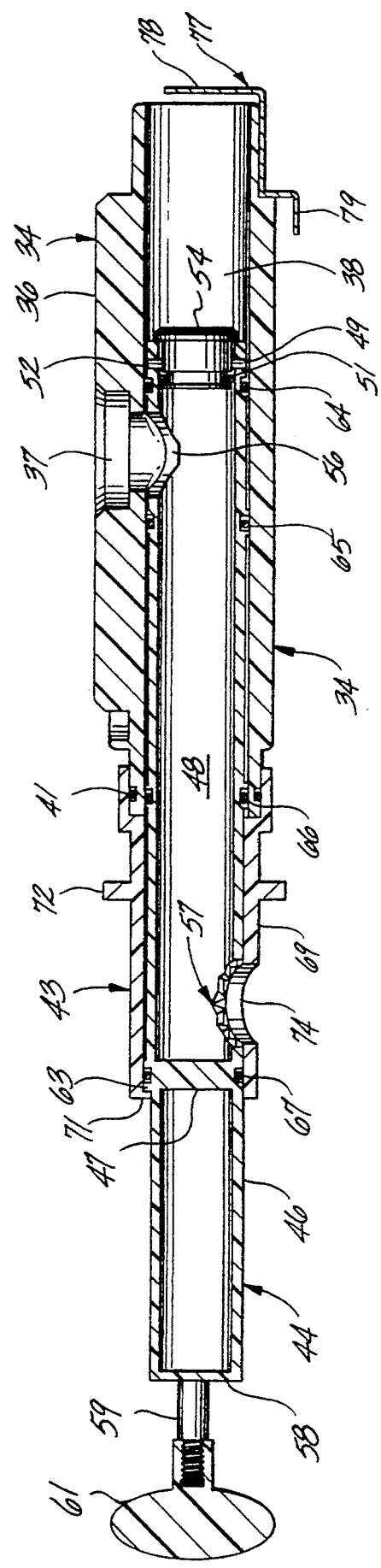
FIG. 7 is a cross-sectional view of the valve assembly shown in FIG. 2.

With reference to FIGS. 6 and 7, the valve plunger 44 has an elongated, tubular, generally cylindrical sidewall 46. The plunger 44 has a forward section and a rearward section separated by a partitioning wall 47. Rearward of the partitioning wall 47 is a generally cylindrical hollow chamber 48 which extends from the partitioning wall 47 to the rearward end of the plunger 44. The rearward end of the plunger 44 is sealed by means of a removable plug 49.

The plug 49 is generally cylindrical and has a closed forward end. The outer diameter of the plug 49 is slightly less than the inner diameter of the plunger body. A circumferential groove extends around the exterior of the plug 49 for carrying an O-ring 51. The O-ring 51 forms a leak-proof seal between the plug 49 and the interior surface of the plunger sidewall 46. The plug 49 comprises a pair of pins 52 which extend laterally outwardly on opposite sides of the plug 49. The pins 52 extend into J-shaped slots 53 at the rearward end of the plunger sidewall 46. The plug 49 further comprises a flange 54 at its rearward end.

Assembly of the plug 49 into the rearward end of the plunger chamber 48 requires the pins 52 to be aligned with the slots 53. The plug 49 is then pushed forwardly into the interior chamber 48 of the plunger until the flange 54 engages the rearward end of the plunger sidewall 46. The plug 49 is then rotated so that the pins 52 follow the curve of the J-shaped slots 53. The pins 52 and the slots 53 prevent the plug 49 from being pushed out of the chamber 48.

At a position slightly forward of the plug 49, the plunger sidewall 46 comprises a generally circular entrance opening 56 through the top of the plunger sidewall 46. The diameter of the entrance opening 56 is about the same as or slightly smaller than the vertical bore 37 in the base 34. An exit opening 57 is provided at the forward end of the chamber 48 through the bottom of the plunger sidewall 46. The shape of the exit opening 57 governs the cross-sectional shape of product extruded or dispensed from the unit. Accordingly, the exit opening may be any desired shape, such as circular, star-shaped, etc. as desired.

A forward end wall 58 is provided at the front end of the plunger 44. A short post 59 coaxial with the plunger sidewall 46 extends forwardly from the forward end wall 58. The forward portion of the post 59 is threaded to receive a knob or handle 61.

Forward of the partitioning wall 47, the upper half of the plunger sidewall 46 is slightly recessed. That is, the upper half of the plunger side wall 46 has an outer diameter slightly less than the lower half of the plunger side wall 46. This provides a longitudinal, horizontal step 62 or notch along each side of the plunger sidewall 46 in the forward section and a semicircular vertical step 63 at the junction of the forward and rearward sections of the plunger. In combination with the valve collar 43, the longitudinal step 62 prevents rotational movement of the valve plunger 44 during use and the semicircular step 63 prevents forward longitudinal movement of the plunger 44 past its open position.

The plunger 44 comprises four circumferential grooves about its exterior, each carrying an O-ring. One circumferential groove and O-ring 64 are located rearwardly of the entrance opening 56. The second circumferential groove and O-ring 66 are located just forward of the entrance opening 56. The third circumferential groove and O-ring 67 are located at a position about midway between the entrance opening 56 and exit opening 57. The fourth circumferential groove and O-ring 68 are located just forward of the exit opening 57.

The valve collar 43 comprises a hollow generally cylindrical body 69 about 4 inches in length. The forward section of the collar body 69 has a diameter the same as the diameter of the transverse bore 38 and extension 39. The rearward section of the collar body 69 has a diameter slightly greater than the outer diameter of the extension 39. The collar 43 has a semicircular lip 71 which extends radially inwardly from the upper half of the of the collar body 69 at its forward end.

The collar 43 further comprises a pair of flanges 72 which extend laterally outwardly on opposite sides of the collar body 69 at the junction of the forward and rearward sections of the collar 43.

The collar 43 is mounted on the outside of the dispensing cabinet 11 with the rearward section of the collar 43 extending into the opening in the front wall 18 of the dispensing cabinet 11 in surrounding relation to the extension 39. The O-ring 41 carried by the extension 39 forms a leak proof seal between the collar 43 and the extension 39. The flanges 72 fit flush against the front wall of the dispensing cabinet. The collar studs 42 which extend through the front wall of the dispenser cabinet 11 pass through holes in each flange 72. A wing nut 73 is threaded onto each stud 42 to secure the collar 43 and base 34 to the front wall 18 of the dispensing cabinet.

An outlet opening 74 is present at the bottom of the forward section of the collar body 69. The outlet opening 74 is about one inch in diameter. When the collar 43 is mounted on the extension 39, the on-center distance between the outlet opening 74 of the collar 43 and the central vertical bore 37 of the base 34 is the same as the on-center distance of the entrance and exit openings 56 and 57 of the valve plunger 44.

The valve plunger 44 is disposed within the transverse bore 38, extension 39 and collar 43 and is afforded longitudinal movement therein between a forward open position and a rearward closed position. Longitudinal movement of the plunger 44 is restricted at the rearward end of the base by a stop bracket 76 which is fixedly attached to the base 34 and comprises a plate 77 which extends upwardly adjacent the rearward end of the transverse bore 38. The stop bracket 76 comprises a tab 78 which extends below the base and into a slot (not shown) in the bottom wall of the dispensing cabinet 11.

Forward longitudinal movement of the plunger is restricted by the front lip 71 of the valve collar 43 which engages the semicircular 63 step of the valve plunger 44. Rotational movement of the plunger 44 is prevented by the ends of the collar lip 71 which engage the longitudinal step 62 of the plunger 44.

In its closed position, the rearward end of the valve plunger 44 engages the plate 77 of the stop bracket 76 at the rearward end of the base 34. In this position, the entrance opening 56 in the valve plunger 44 is not aligned with the vertical bore 37 of the base 34. The plunger side wall 46 thus blocks passage of soft serve product through the vertical bore 37 of the base 34. In its open position, the entrance opening 56 is aligned with the vertical bore 37 of the base 34 and the exit opening 57 is aligned with the outlet opening 74 of the collar 43. This provides an open pathway for soft serve product to flow from the cartridge 22 through the vertical bore 37 of the base 34, through the interior chamber 48 of the valve plunger 44 and out the exit opening 57 of the plunger 44 and outlet opening 74 of the collar 43.

Figure 8:
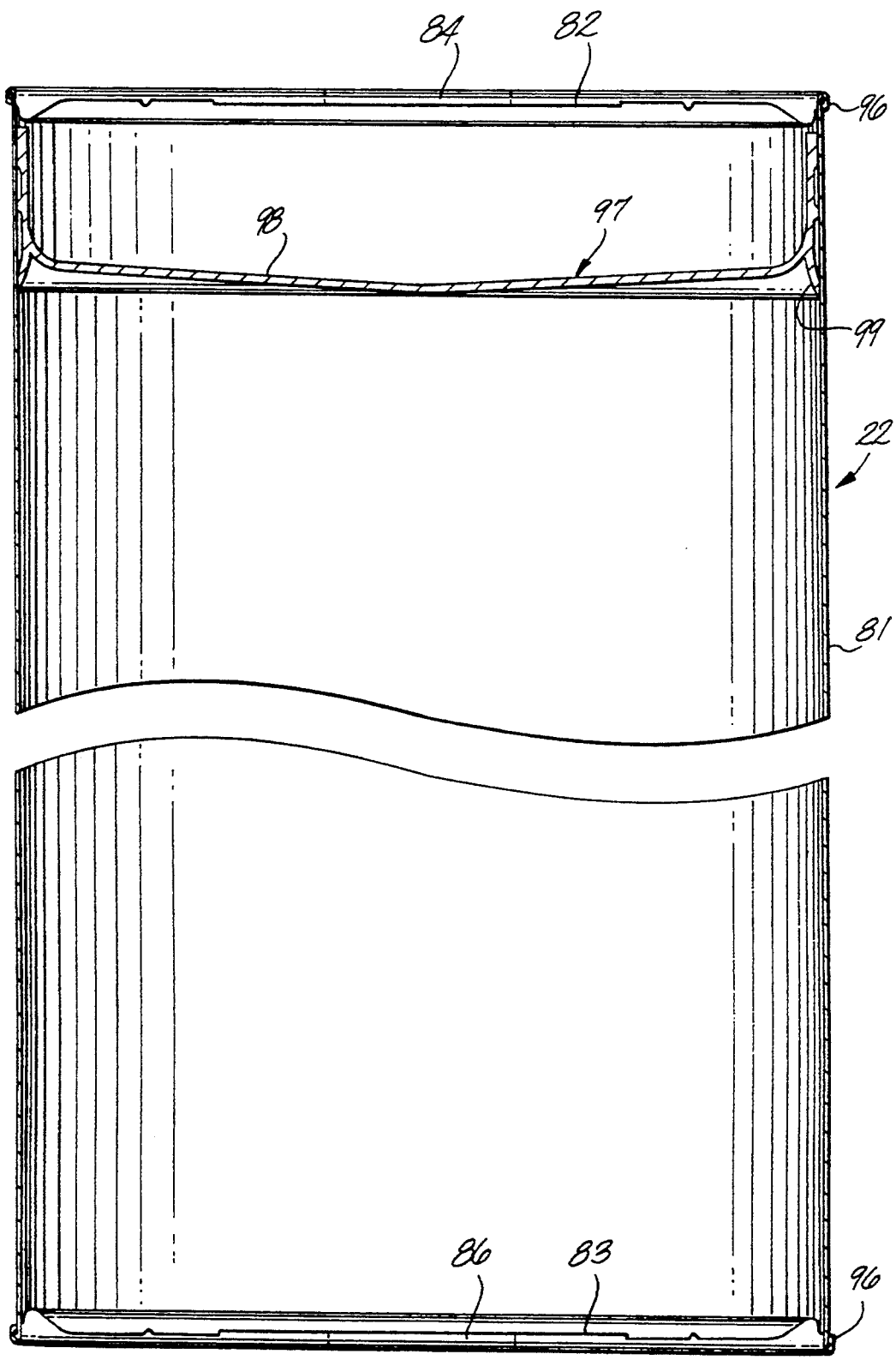
FIG. 8 is a cross-sectional view of a preferred cartridge.
Figure 9:
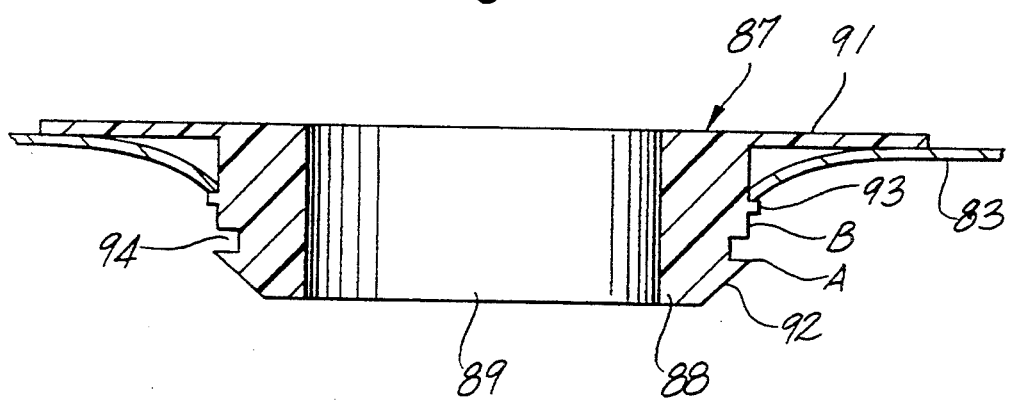
FIG. 9 is a fragmentary cross-sectional view of the bottom wall of the cartridge showing a preferred fitment.
Figure 10:
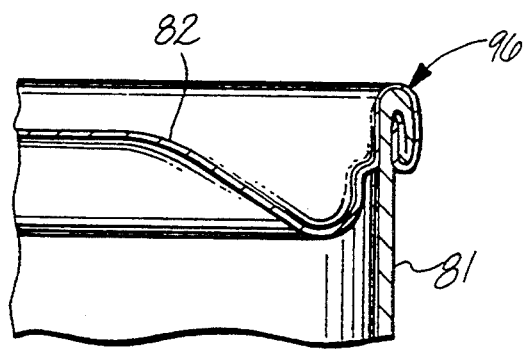
FIG. 10 is an enlarged cross-sectional cut-away view of a preferred seal between an end wall and side wall of the cartridge.

FIGS. 8–10 show the construction of a preferred cartridge 22. The cartridge 22 comprises a rigid, preferably cylindrical side wall 81 and generally rigid top and bottom end walls 82 and 83. The side wall 81 is preferably made of suitable metal, plastic or a rigid cardboard construction as is well known in the art. The end walls 82 and 83 are preferably made of a suitable metal or plastic. In the embodiment shown, the diameter of the cartridge 22 is about 6.5 inches, and the length is about 15 inches. This provides an interior volume of about 2 gallons. It is understood that the selection of dimensions and cartridge shape is a matter of design choice.

The top end wall 82 of the cartridge 22 has a small opening 84 at its center to receive compressed air. The size of the opening 84 is not critical. In the embodiment shown, the opening has a diameter of about 0.375 inch. The bottom end wall 83 also has a central opening 86. The inner edge portions of the bottom end wall 83 defining the opening 86 curve downwardly to form a generally conical surface. In the embodiment shown, the opening 86 has a diameter of about 1.5 inches.

With reference to FIG. 9, a plastic fitment 87 is mounted in the opening 86 of the cartridge bottom wall 83. The fitment 87 comprises a short cylindrical body 88 having a large central bore 89. The outer diameter of the body 88 is about the same as the diameter of the opening 86. Extending laterally outwardly at the top of the body 88, there is a large annular flange 91. The bottom end of the fitment body 88 comprises a chamfered surface 92. The fitment 87 is press fitted into the opening 86 in the cartridge bottom end wall 83 until the inner edge of the bottom end wall 83 passes a circumferential rib 93 and the flange 91 engages the top surface of the bottom end wall 83. The rib 93 and flange 91 secure the fitment 87 in place.

The fitment 87 has a circumferential groove 94 below the rib 93 at the top of the chamfered surface 92. The groove 94 has a generally square cross section. The outer diameter of the fitment body 88 at the top of the chamfered surface 92 (point A) is slightly larger than the diameter of the remainder of the fitment body 88 (e.g., at point B), and slightly larger than the diameter of the vertical bore 37 of the base 34. In this manner, the fitment 87 may be press fitted, without undue effort, into the vertical bore 37 of the base 34, with the upper edge of the chamfered surface 92 forming a seal with the inner surface of the base 34 defining the vertical bore 37.

During storage and tempering of the cartridge 22, the fitment 87 is sealed with a plastic cap 90 (FIG. 1) which prevents leakage of soft serve product contained by the cartridge. The cap is then removed before installation of the cartridge 22 on the base 34. Preferably, the cap comprises a tab or flange to assist in removing the cap from the fitment 87.

The outer edges of the end walls 82 and 83 of the cartridge 22 are sealed to the end edges of the side wall 81 of the cartridge as shown in FIG. 6. The end edge portion of the cartridge side wall 81 is double-backed onto itself and the outer edge portions of the top end wall 82 and bottom end wall 83 curve around and between the double-backed portions of the side wall 81 as shown. Such a seal is readily formed by equipment available in the art. It is understood that any form of a leak-proof seal between the side wall and the end walls of the cartridge may be used.

The seals form circumferential lips 96 around the periphery at the end wall 82 and 83. The lips 96 extend laterally outwardly from the side wall 81 and upwardly from the top end wall 82 and downwardly from the bottom end wall 83. Preferably, the inner diameter of the lip 96 is slightly larger than the diameter of the circular upper surface 36 of the base 34. In such an arrangement, when the cartridge 22 is mounted on the base with the fitment 87 extending into the vertical bore 37 of the base 34, the upper surface 36 of the base 34 fits inside the lip 96, and engages the bottom end wall 83 of the cartridge 22.

As shown in FIG. 8, a piston 97 is provided within the cartridge 72 at a position adjacent the top end wall 82, i.e. above the soft serve product contained within the cartridge 22. The piston 97 comprises a generally circular body 98 extends across the entire interior transverse cross-section of the cartridge 22. A wiping edge 99 which extends downwardly and from the body 98 and engages the interior surface of the cartridge 22.

Again with reference to FIG. 6, the cartridge 22 is releasably secured to the base 34 by means of a lock-down assembly. The lock-down assembly comprises a pair of metal rods 101, each having threaded lower ends which extend through holes in supports 102 which are integral with and which extend laterally outwardly from each side of the base 34. Nuts 103 and 104 threaded onto the rods 101 above and below the vertical holes of the supports 102 secure the rods 101 to the supports 102, and hence, to the base 34. In the embodiment shown, the rods 101 extend upwardly from the supports 102 a distance equal to about 12 inches, i.e., about 80% of the length of the cartridge 22. A first spring 106 is mounted in surrounding relation to each rod 101. The first spring 100 fits loosely around the rod 101 and extends up the length of the rod 101 about 7 to 8 inches.

Above the first spring 106, there is mounted a retainer channel assembly 107. The retainer channel assembly 107 comprises an elongated, generally vertical retainer channel 108. At the bottom of the retainer channel 108, there is a C-shaped bracket 109 with holes in the lower and upper legs of the C-shaped bracket 109 through which the rod 101 extends. A generally horizontal slot is provided in the side leg of the C-shaped bracket 109. The slot receives a tab 114 at the rearward end of a release lever 116. The release lever 116 also comprises a hole through which the rod loosely extends. A second spring 118 is mounted in surrounding relation to the rod 101 between the upper leg of the C-shaped bracket 109 and the release lever 116.

Spaced apart upwardly along the length of the retainer channel 107 from the C-shaped bracket 109, there is provided a short horizontal intermediate bracket 119 comprising a hole (not shown) through which the upper end of the rod 101 extends. At the top of the retainer channel 107, there is an upper bracket 121 having a threaded stud 123 which extends upwardly. The threaded stud 123 is generally coaxial with the rod 101 which extends through the holes in the C-shaped lower bracket 109 and the hole in the intermediate bracket 119.

A top plate 124 is mounted at the top of the retainer channel assembly 107. The top plate 124 is generally disk-shaped with bracket supports 126 extending laterally outwardly on opposite sides of the top plate 124.

The bracket supports 126 comprise slots 127 through which the threaded studs 123 of the retainer channel assembly 107 extend. Nuts 128, threaded onto the studs 123 above the bracket supports 126 secure the top plate 124 to the retainer channel assemblies 107.

Figure 11:
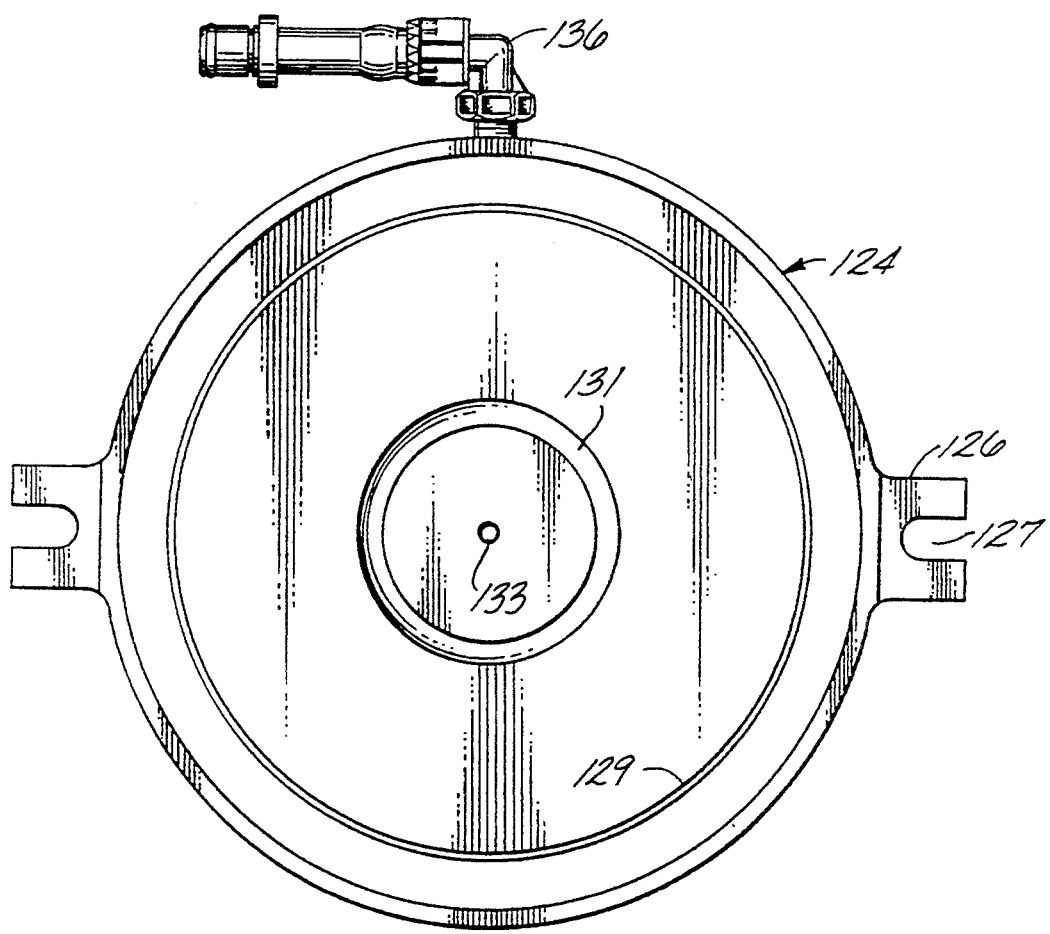
FIG. 11 is a bottom plan view of the top plate.

With reference to FIG. 11, the top plate 124 comprises two concentric circular grooves 129 and 131 on its lower surface. The outer circular groove 129 is slightly wider than the lip 96 of the cartridge 22 and has about the same diameter as the cartridge lip 96. The diameter of the inner circular groove 131 is greater than the diameter of the opening 84 in the top end wall 82 of the cartridge 22. An O-ring 132 (FIG. 6) is carried by the inner groove 131.

Figure 15:
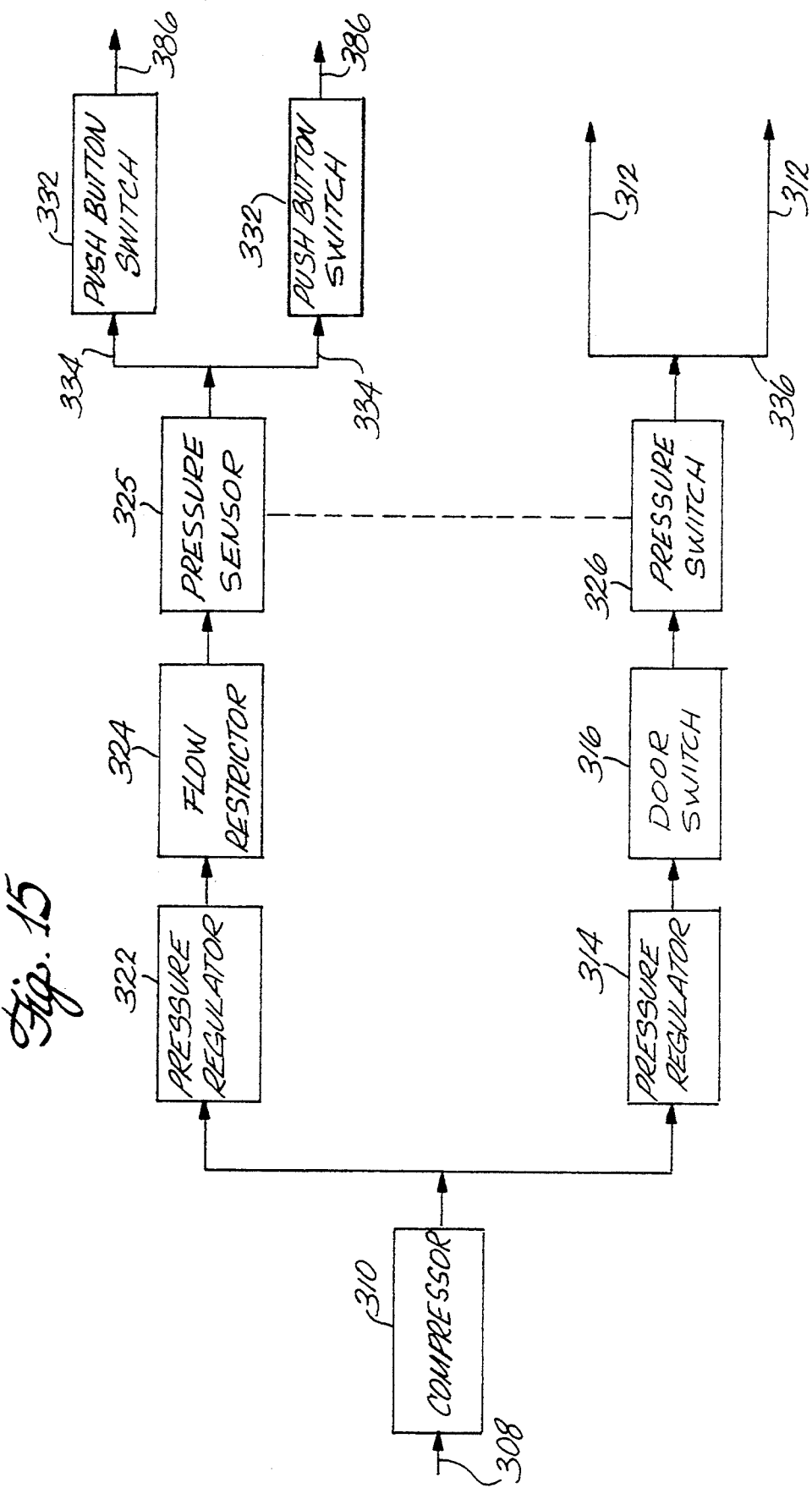
FIG. 15 is a schematic diagram of the compressed air system of a preferred valve assembly.

An air passageway is provided in the top plate. The air passageway extends from a central opening 133 in the bottom surface of the top plate 124 within the inner groove 131 to an air inlet opening at the side of the top plate 124. A fitting 136 is mounted the air inlet opening for receiving the end of a compressed air conduit 312 (FIG. 15). The connection between the fitting 136 and the air line is preferably a quick release connection as is well known in the art.

An air compressor 310 and pressure regulator 322 are provided to deliver compressed air at a pressure of from about 8 to about 15 psi and preferably at about 10 psi to the top plate 127 via conduit 312. Any suitable air compressor and regulator may be used. Model 0531-102B347X, manufactured by Gast Corporation has been found to be suitable for use with this invention.

A switch, having an activating button 141 is mounted at the front of the dispensing chamber. The switch activates a valve positioned along the compressed air line. When the dispensing cabinet door is opened, the valve is activated by the switch to simultaneously stop the flow of compressed air to the cartridge and vent the downstream compressed air line and thus relieve the pressure within the cartridge. This is done for safety reasons. When the door is closed, the valve closes the vent and opens the compressed air line to the cartridge and the air pressure builds within the air line and cartridge to the desired level.

In practice, a cartridge 22 of hard frozen soft serve product is tempered in the tempering cabinet 12 until it reaches the desired serving temperature. Once it is at the desired temperature, it is then installed in the dispensing cabinet 11. To do this, the cap of the cartridge 22 is removed. The top plate 124 of the lock down mechanism assembly is raised by lifting up on the release levers 116 and allowing the first springs 106 to bias the top plate 124 and retainer channel assembly 107 upwardly along the rods 101.

The cartridge 122 is then mounted on the base 34 with the fitment 87 extending downwardly into the vertical bore 37 of the base 34. The top plate 124 of the lock down assembly is then pushed downwardly until it engages the top end wall 82 of the cartridge 22, the lip 96 at the top end wall 82 extending into the outer groove 129 of the top plate 124. The O-ring 132 positioned in the inner groove 131 of the top plate 124 forms a seal with the surface of the top end wall 82 of the cartridge 22.

In this arrangement, the second spring 118 of the lock down assembly biases the release lever 116 downwardly. The tab 114 of the release lever 116 which is engaged in the slot of the C-shaped bracket 109 forms a hinge and the release lever 116 pivots downwardly at an angle until the edges of the hole in the release lever frictionally engage the rods 101 which extend through the hole. The frictional engagement prevents the retainer channel assembly and top plate 124 from moving upwardly. Lifting the ends of the release levers 116 pivots the release levers 116 upwardly to a generally horizontal position, which releases the frictional engagement between the release levers 116 and the rods 101.

The compressed air line is attached to the fitting 136 and the air compressor is activated to supply compressed air at the desired pressure to the top plate 124 and into the cartridge 22 through opening 84. The air pressure within the interior of the cartridge 22 biases the top end wall 82 against the O-ring 132 carried by the inner groove 131 of the top plate 124 further enhancing that seal.

When the soft serve product is to be dispensed, the valve plunger 44 is moved from its closed position to its open position. The air pressure within the interior of the cartridge biases the cartridge piston 97 downwardly forcing soft serve product through the base 34 and valve plunger 44 and out the outlet opening 74. When sufficient product has been dispensed, the valve plunger 44 is moved to its closed position which blocks the flow of soft serve product.

The present invention provides several unique advantages. For example, when the valve plunger 44 is in its closed position, all soft serve product within the interior chamber of the valve plunger 94 is contained within the dispensing cabinet and hence maintained at the proper dispensing temperature. This avoids any problem with melting and dripping of the product from the outlet opening of the valve plunger.

Another advantage is the ease in which a cartridge can be installed and removed from the dispensing cabinet. Also, the apparatus has very few components which must be cleaned, and those components are easily removed, if necessary, for cleaning.

Figure 12:
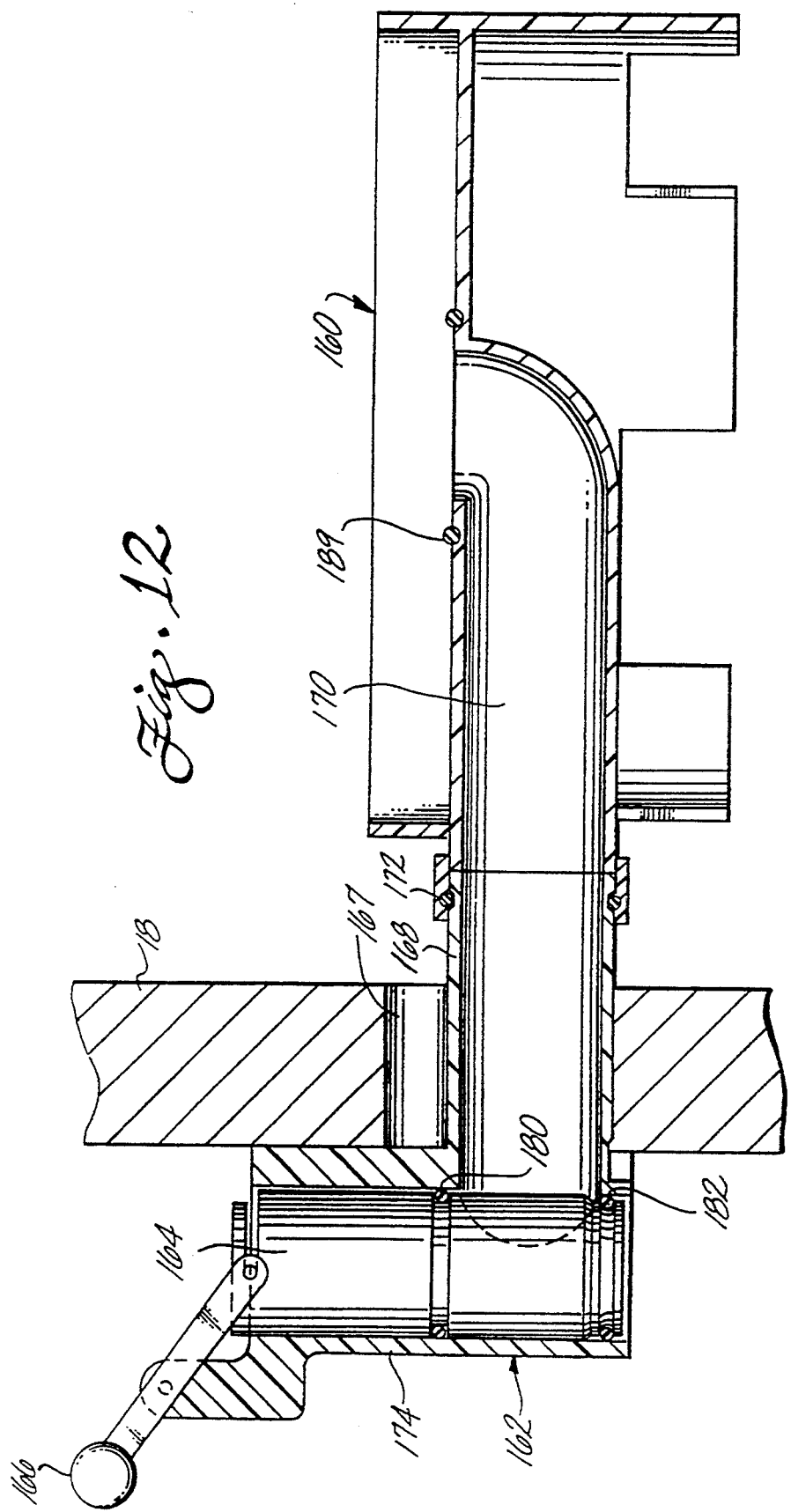
FIG. 12 is a side cross-sectional of another preferred valve assembly.
Figure 13:
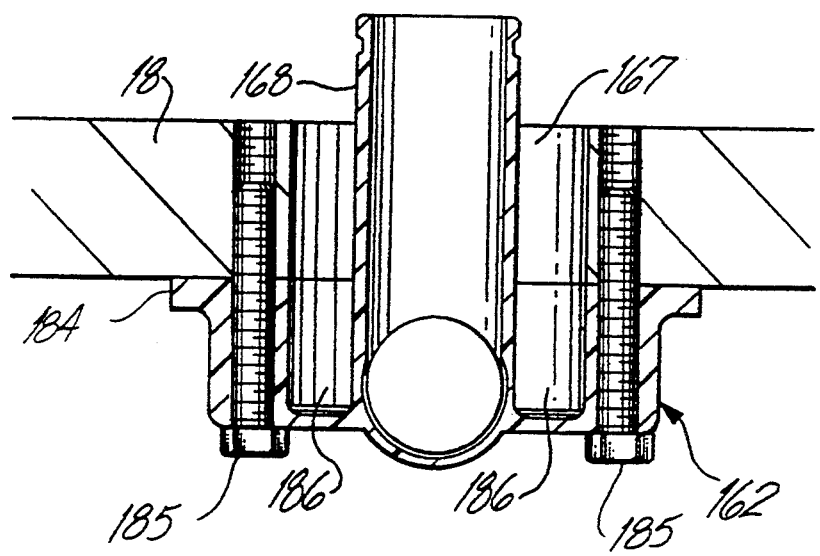
FIG. 13 is a top cross-sectional view of the valve head shown in FIG. 12.

It is apparent that many changes in the above described embodiments may be practiced without departing from the scope of the invention. For example, another preferred valve assembly is shown in FIGS. 12 and 13. The valve assembly comprises a base 160, a valve head 162, a valve plunger 164 and a handle 166. The base 160 is mounted in the dispensing cabinet 11 and the valve head 162 is mounted on the exterior side of the front wall 18 of the dispensing cabinet 11 and has a generally horizontally tubular extension which extends through an opening 167 in the front wall 18 of the dispensing cabinet 11 and into a transverse bore 170 of the base 160. An O-ring 172 carried in a circumferential groove at the rearward end of a horizontal tubular extension 168 providing a seal between the tubular extension 168 and the transverse bore 170 of the base 160. The rearward end of the horizontal tubular extension 168 is open and forms an inlet opening into the valve head 162.

The valve head 162 also comprises a plunger housing 174 which has a hollow vertical bore which communicates with and extends upwardly at the forward end of the horizontal extension 168. The plunger housing 174 is open at its upper and lower ends, the lower open end forming the outlet opening of the valve head 162. The plunger housing 174 carries a movable valve plunger 164 which is a piston that is manually movable between open and closed positions by means of a handle 166 which is hinged to the plunger housing 174 and pivotally mounted at the top end of the plunger 164. O-rings 180 and 182 form a seal between the plunger 164 and the plunger housing 174.

With reference to FIGS. 12 and 13, the valve head 162 is mounted on the exterior of the front wall 18 of the dispensing cabinet 11 by means of bolts 185 which extend through a generally rectangular front flange wall 184. The front flange wall 184 comprises recesses 186 surrounding the forward end of the horizontally tubular extension 168. The opening in the front wall 18 of the dispensing cabinet 11 through which the horizontal extension 168 passes is sufficiently large to allow cold air in the dispensing cabinet 11 to circulate into the recesses 186 formed by the front flange wall 184 to maintain the temperature of product within the horizontal extension 168 at the proper serving temperature.

In a particularly preferred embodiment of the invention as illustrated in FIG. 13, the circulation of air within the dispensing cabinet 11 is designed so that cold air is blown toward the valve head 162 and into the recesses 186 to thereby enhance the circulation of cold air in the recesses 186 and around the horizontal tubular extension 168 to prevent any product trapped within the valve from melting.

Figure 16:
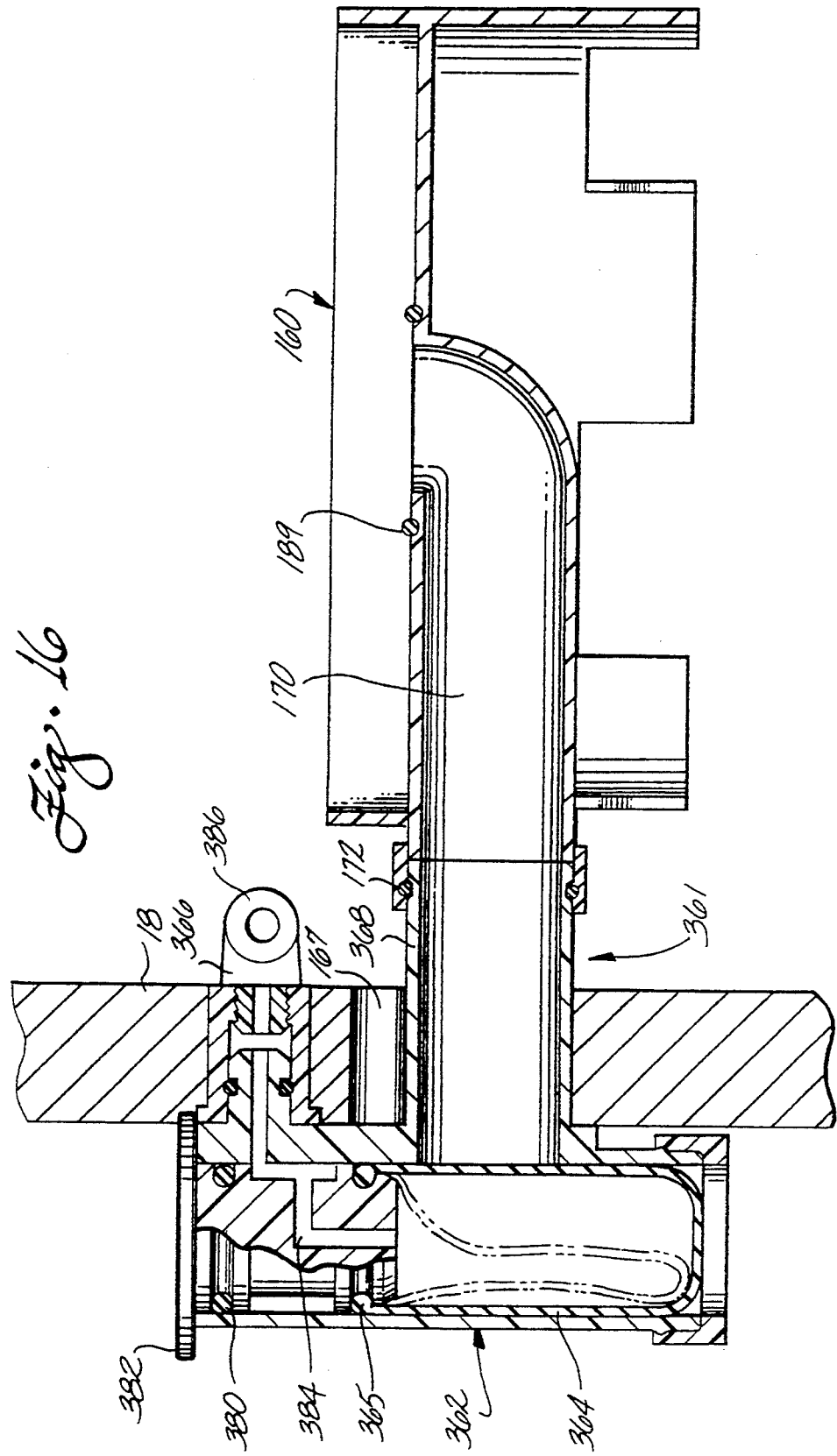
FIG. 16 is a side cross-sectional view of another preferred valve assembly.

In another embodiment of a preferred valve assembly, rather than using a movable piston to operate the valve, an air operated valve 361 uses an inflatable bladder to alternately block or permit flow of frozen confection. Referring to FIGS. 15 and 16, the valve comprises a base 160 the same as that described for the piston operated valve to which the cartridge is sealed at O-ring 189. The base has a transverse bore 170 through which frozen confection flows.

The valve includes a valve head 362 that defines a vertical bore that communicates with a generally horizontal tubular extension 368 that extends through the front wall 18 of the dispensing cabinet 11. Inside the cabinet, the tubular extension seals with the transverse bore at O-ring 172.

The top of the vertical bore of the valve head is sealed with valve cap 382 at O-ring 380. An inflatable bladder 364 fits within the vertical bore and attaches to the valve cap at a sealing lip 365 on the bladder. When inflated, the bladder expands to fill the vertical bore and block flow of frozen confection from the tubular extension. An air flow path 384 is defined by the valve cap 382 and a valve head 362 and communicates with the bladder 364 for providing a path for compressed air to alternately inflate or deflate the bladder 364.

A fitting 366 connects one end of an air conduit 386 to the flow path 384. The other end of conduit 386 connects with a push button switch 332 mounted on the cabinet. An air line 334 supplies compressed air to the push button switch 332. The push button switch 332 is a spring valve that normally allows flow from the air line 334 to the bladder 364 via the fitting 366 and flow path 384 in order to inflate the bladder 364 and prevent flow of frozen confection. When the push button switch 332 is depressed, the flow of compressed air to the bladder 364 stops and the air in the bladder 364, flow path 384 and conduit 386 are vented causing deflation of the bladder 364 as illustrated by the phantom lines of FIG. 16.

An air operated valve such as this also includes recesses in the valve head to promote circulation of cold air around the valve. The recesses are identical to those disclosed for a piston operated valve as illustrated in FIG. 13.

Figure 17:
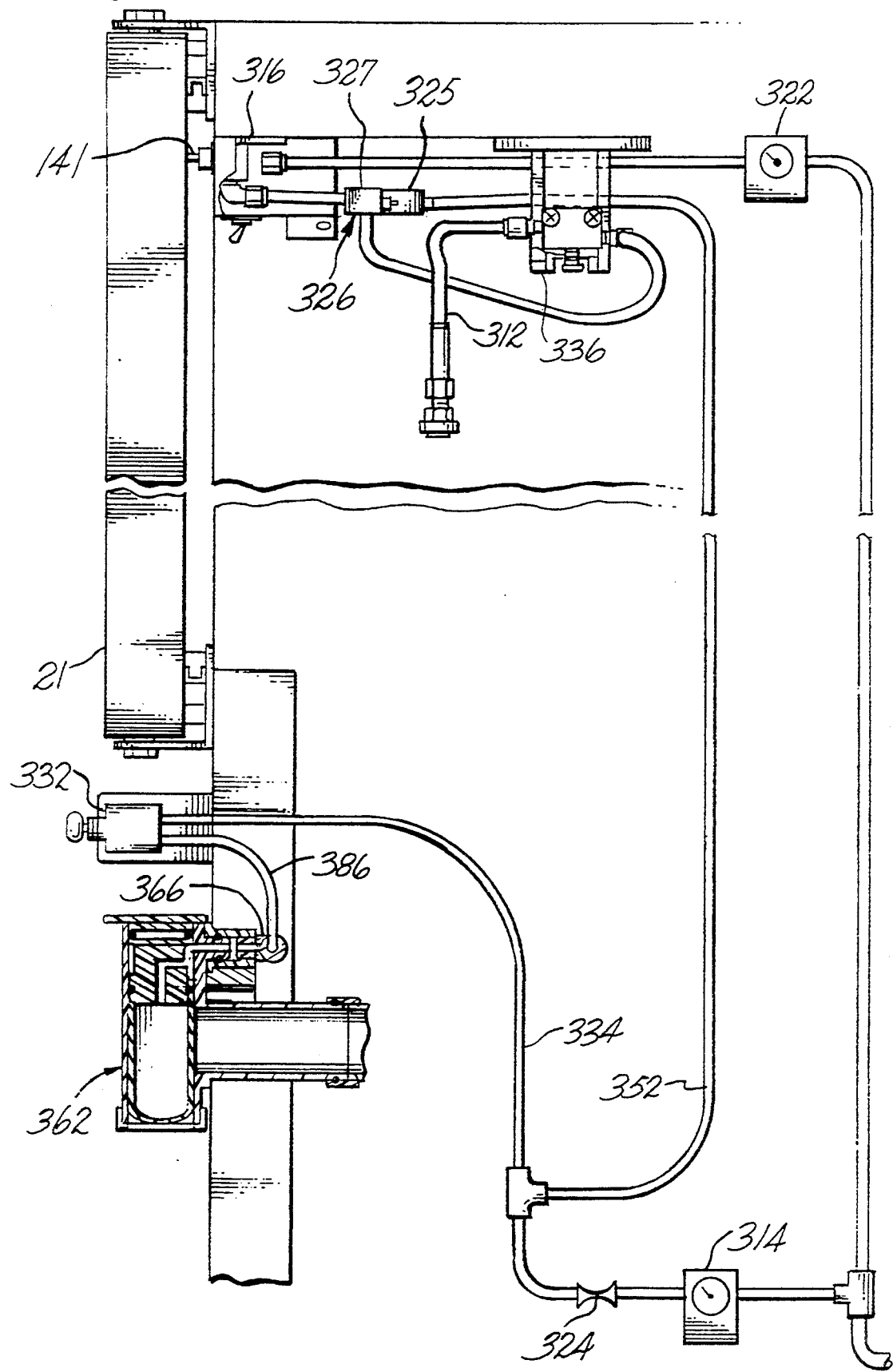
FIG. 17 is a side cross-sectional view of a preferred valve assembly and leak detection system.

The compressed air system is illustrated in FIG. 17 and is shown schematically in FIG. 15. In the preferred embodiment, compressor 310 is used to compress ambient air 308 for use in biasing the frozen confection from the cartridge 22 and also as the source of compressed air for inflating the bladder 364. In order to properly inflate the bladder 364 and overcome the pressure of the cartridge 22, the bladder pressure must be greater than that of the cartridge 22. Pressure regulator 314 is used to maintain pressure to the bladder. If the air to the cartridge is maintained at 10 psi, the air to the bladder 364 should be maintained at a slightly higher pressure, for example, 15 psi.

One potential problem with an air operated valve such as is disclosed is that upon failure of the compressed air to the bladder 364, if the pneumatic system for the cartridge 22 is maintained under pressure, the entire contents of the cartridge 22 would be discharged. This problem is overcome in part by the use of a common air compressor 310 for both the bladder and the cartridge. If the compressor 310 were to unexpectedly fail, the pneumatic systems for the cartridge 22 and the bladder 364 would tend to simultaneously depressurized minimizing the loss of product.

Further protection may be provided by including a pressure sensor 325 and pressure switch 326 for automatically shutting off the flow of compressed air to the pneumatic system for the cartridge 22 while simultaneously depressurizing that system. A flow restrictor 324 located downstream of pressure regulator 314 will cause a high pressure drop upon high flow through the flow restrictor such as would occur if a leak were to develop in the bladder 364 or some other part of the system downstream of the flow restrictor 324. From the flow restrictor 324, the air line branches into a first line 352 to the pressure sensor 325 and a second line 354 to the push button switch 332. The high pressure drop across the flow restrictor 324 causes a low pressure condition downstream of the flow restrictor 324 at the pressure sensor 325. Upon such a low pressure condition, the pressure switch 326 is activated to automatically stop flow of compressed air to the cartridge 22. While such a pressure sensor and pressure switch combination is illustrated schematically as having separate components, a one piece device such as an air switch 327 that pneumatically senses a low pressure to shut down flow is well known in the art.

The flow restrictor 324 is preferably located close to regulator 314 so the pressure switch 326 is able to work effectively for leaks in most parts of the system. It should also be recognized that the flow restrictor 324 and the pressure switch 326 must be properly sized so as not to engage on the temporary low pressure condition that exists during normal operation when the bladder 364 is being inflated after releasing the push button switch 332.

In the embodiment illustrated, a single pressure sensor 325 and pressure switch 326 combination is used to depressure all cartridges 22 at a cartridge air manifold 336. However, it is clear that if desired, separate pressure sensors 325 and pressure switches 326 can be located at every push button switch to selectively depressure a cartridge 22 if the air to its particular bladder valve 361 fails.

It is also understood that, rather than a fitment which extends from a cartridge into the base, an O-ring 189 mounted in a circular groove in the base 160, as shown in FIGS. 12 and 15, may provide an adequate seal between the base and the cartridge, particularly when the automatic clamp down means described below is used.

On the other hand, the means for releasably securing the cartridge to the base may simply comprise a fitment having external threads extending downwardly from the bottom end wall of the cartridge which threads into a corresponding threaded vertical hole in the base. The cartridge is thus secured by threading the fitment into the vertical hole until the cartridge is snug against the base. In such an embodiment, the upper end wall of the cartridge would preferably comprise a second fitment which extends upwardly and comprises a fitting for direct connection to a compressed air line.

Figure 14:
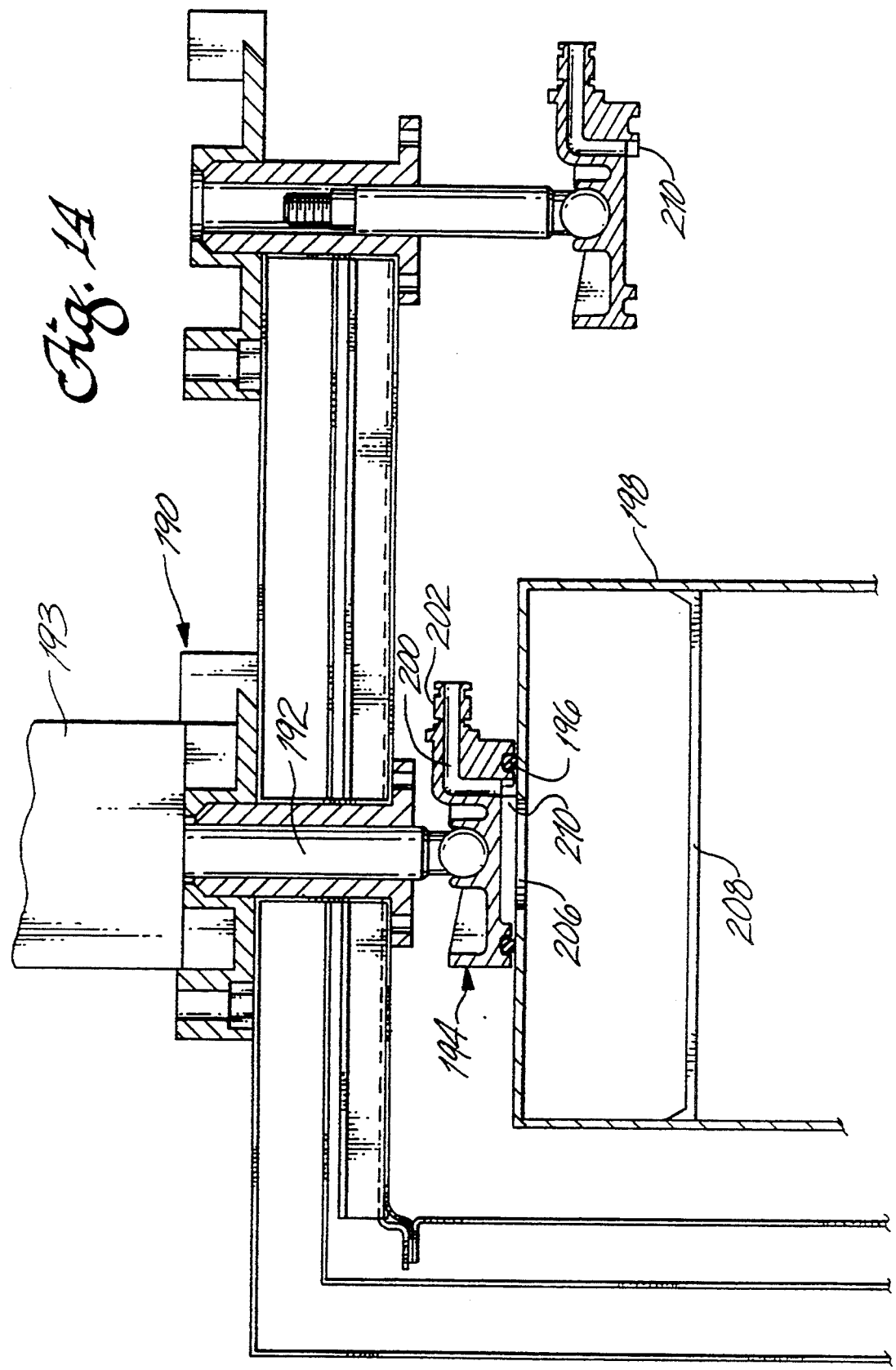
FIG. 14 is a side cross-sectional view of a preferred automatic clamp-down assembly.

It is also understood that the means for releasably securing the cartridge to the base in the dispensing unit may vary as desired. For example, with reference to FIG. 14, there is shown another preferred automatic clamp-down means. The clamp-down means comprises a piston assembly 190 mounted on the top wall of the dispensing cabinet. The piston assembly 190 comprises a movable piston 192 of, for example, an air driven or hydraulic cylinder 193. A swivel head 194 is pivotally mounted at the lower end of the piston 192. The swivel head 194 comprises a circular groove which carries an O-ring 196 for sealing the swivel head 194 to the top surface of a product cartridge 198. The swivel head 194 further comprises an airway 200 including an inlet port 202 which is connectable to a coupling (not shown) at the end of a compressed air line. The airway 200 extends from the inlet port 202 to an outlet opening within the O-ring 196. In such an arrangement, compressed air passing through the airway 200 is forced into the opening 206 at the upper end of the cartridge 198 to create a downward force against the movable piston 208 within the cartridge 198.

At the outlet opening of the airway 200, there is provided a needle valve 210 to releasably block the passage of air through the airway 200. When the piston assembly 190 is activated so that the piston 192 moves downwardly until the swivel head 194 engages the top surface of the cartridge 198, a plunger in the needle valve 210 is pushed upwardly, opening the airway 200 and allowing compressed air to pass into the space between the swivel head 194 and the cartridge 198 and then into the cartridge 198. When the piston assembly 190 is deactivated so that the piston 192 moves upwardly, the plunger of the needle valve 210 disengages the top of the cartridge 198 and the airway 200 is blocked. An on/off switch (not shown) is provided, preferably at the front of the interior of the dispensing cabinet to raise an lower the piston and swivel head.

It is understood that, in such an embodiment, a swivel head is associated with each cartridge mountable in the dispensing cabinet. The swivel heads may be raised and lowered independently or together as desired. If it is desired to raise and lower all of the swivel heads simultaneously, the swivel heads may be mounted on a single plate which is raised and lowered by a single piston.

As yet other examples of variations, it is understood that, while compressed air is the preferred means for biasing the cartridge piston against soft serve product contained in the cartridge and for operating a valve having an inflatable bladder, any means, e.g. mechanical means, for biasing the piston against the soft serve product may be used. Similarly, other gases such as nitrogen gas could be used as a replacement for air. The term "compressed air" should, therefore, not be limited to just air, but should include any gas as well as other hydraulic fluids.

It is further understood that the shapes of the base and other components of the valve assembly may be varied as desired. Further, the base may be an integral part of the dispensing cabinet, if desired.

Accordingly, the foregoing description should not be read as pertaining only to the precise structures and apparatus described in the accompanying drawings, but rather should be read as support to the following claims which are to have their fullest fair scope.

What is claimed is:

1. A valve for dispensing frozen confections from a pressurized cartridge mounted in a dispensing cabinet cooled by refrigerated air comprising:
    a valve body that defines:
        an inlet opening in communication with the cartridge inside the dispensing cabinet;
        an outlet opening outside the dispensing cabinet through which the frozen confection is dispensed;
        a passageway connecting the inlet and outlet openings; and
        at least one recess in communication with the refrigerated air of the dispensing cabinet for cooling the valve body; and
    means for alternately closing and opening the passageway to prevent or permit the flow of frozen confection from the cartridge to the outlet opening.

2. The dispensing valve of claim 1 wherein the closing means comprises a piston movably mounted within the outlet opening for alternating between closed and opened positions.

3. The dispensing valve of claim 2 further comprising a lever for moving the plunger between the opened and closed positions.

4. The dispensing valve of claim 1 wherein the closing means comprises an inflatable bladder for blocking the outlet opening such that when the bladder is inflated, flow of the frozen confection is prevented and when the bladder is deflated, flow of the frozen confection is permitted.

5. The dispensing valve of claim 4 further comprising a compressed gas system that includes:
    a source of compressed gas;
    a gas valve operatable between opened and closed positions; and
    a gas conduit for transmitting the compressed gas through the gas valve to the inflatable bladder whereby operation of the gas valve enables inflation and deflation of the bladder.

6. The dispensing valve of claim 5 wherein the gas valve is operatable by a push button switch.

7. The dispensing valve of claim 6 wherein the push button switch is a spring activated switch, which when depressed, moves the gas valve to its open position and when released, moves the gas valve to its closed position.

8. A dispensing unit for dispensing frozen soft serve confection comprising:
    a refrigerated cabinet;
    a cartridge for containing the frozen confection;
    a first compressed air system for biasing confection out of the cartridge;
    a compressed air operated confection dispensing valve;
    a second compressed air system for operating the dispensing valve; and
    a leak detection system for detecting leaks in the second compressed air system and deactivating the first compressed air system.

9. The dispensing unit of claim 8 further comprising:
    a compressor;
    a first pressure regulator for regulating the pressure of compressed in the first compressed air system; and
    a second pressure regulator for regulating the pressure of compressed air in the second compressed air system.

10. The dispensing unit of claim 9 wherein the leak detection system comprises:
    a flow restrictor in the second compressed air system;
    a pressure sensor located downstream of the flow restrictor; and
    a pressure switch activable by the pressure sensor on a low pressure condition for stopping flow of compressed air to and depressurizing the first compressed air system.

11. The dispensing unit of claim 10 wherein the pressure sensor and pressure switch are combined as an air switch.

12. The dispensing unit of claim 8 wherein the dispensing valve comprises:
    a valve body that defines:
        an inlet opening in communication with the cartridge inside the dispensing cabinet;
        an outlet opening outside the dispensing cabinet through which the frozen confection is dispensed; and
        a passageway connecting the inlet and outlet openings; and
    an inflatable bladder mounted within the outlet opening wherein when the bladder is inflated, flow of the frozen confection is prohibited, and when the bladder is deflated, flow of the frozen confection is permitted.

13. The dispensing unit of claim 12 wherein the refrigerated cabinet is cooled by refrigerated air and the dispensing valve further comprises at least one recess formed within the valve body and in communication with the refrigerated air of the dispensing cabinet for cooling the valve body.

14. A valve for dispensing frozen confections from a pressurized cartridge mounted in a dispensing cabinet cooled by refrigerated air comprising:
    a valve body that defines:
        an inlet opening in communication with the cartridge inside the dispensing cabinet;
        an outlet opening outside the dispensing cabinet through which the frozen confection is dispensed;
        a passageway connecting the inlet and outlet openings; and
        a recess in communication with the refrigerated air of the dispensing cabinet for cooling the valve body; and an inflatable bladder for blocking the passageway such that when the bladder is inflated, flow of the frozen confection is prevented and when the bladder is deflated, flow of the frozen confection is permitted.

15. The valve of claim 14 further comprising a compressed gas system that includes:

a source of compressed gas;

a gas valve operatable between opened and closed positions; and a gas conduit for transmitting the compressed gas through the gas valve to the inflatable bladder whereby operation of the gas valve enables inflation and deflation of the bladder.

16. The dispensing valve of claim 15 wherein the gas valve is operatable by a push button switch.

17. The dispensing valve of claim 16 wherein the push button switch is a spring activated switch which, when depressed, moves the gas valve to its open position and, when released, moves the gas valve to its closed position.

* * * * *